United States Patent
Lim

(10) Patent No.: US 9,765,217 B2
(45) Date of Patent: Sep. 19, 2017

(54) FIRE-RETARDANT COMPOSITION OF AN ALLOY OF POLYAMIDE AND POLYESTER RESINS

(75) Inventor: Mok-Keun Lim, Seoul (KR)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 14/241,335

(22) PCT Filed: Aug. 20, 2012

(86) PCT No.: PCT/EP2012/066181
§ 371 (c)(1),
(2), (4) Date: Jun. 11, 2014

(87) PCT Pub. No.: WO2013/030024
PCT Pub. Date: Mar. 7, 2013

(65) Prior Publication Data
US 2014/0378583 A1  Dec. 25, 2014

(30) Foreign Application Priority Data

Aug. 26, 2011  (FR) ...................................... 11 57554

(51) Int. Cl.
*C08L 77/06* (2006.01)
*C08L 67/02* (2006.01)
*C08L 77/00* (2006.01)
*C08K 5/00* (2006.01)
*C08K 5/51* (2006.01)

(52) U.S. Cl.
CPC .............. *C08L 77/06* (2013.01); *C08L 67/02* (2013.01); *C08L 77/00* (2013.01); *C08K 5/0066* (2013.01); *C08K 5/51* (2013.01); *C08L 2201/02* (2013.01); *C08L 2207/20* (2013.01)

(58) Field of Classification Search
USPC ........ 524/100, 101, 126–154, 414, 494, 496
See application file for complete search history.

(56) References Cited

U.S. PATENT DOCUMENTS

| 4,150,674 | A |   | 4/1979 | Yung |
| 5,055,509 | A |   | 10/1991 | Bhattacharjee et al. |
| 5,244,973 | A | * | 9/1993 | Sakazume ................ C08L 55/02 525/166 |
| 5,278,230 | A | * | 1/1994 | Bell .......................... C08L 67/02 525/179 |
| 5,296,550 | A |   | 3/1994 | Natarajan et al. |
| 5,475,058 | A |   | 12/1995 | Horiuchi et al. |
| 5,798,065 | A | * | 8/1998 | Picha ........................... 264/46.4 |
| 6,025,419 | A | * | 2/2000 | Kasowski ............. C08K 5/0066 524/100 |
| 6,136,892 | A | * | 10/2000 | Yamauchi et al. ............ 523/206 |
| 6,211,402 | B1 |   | 4/2001 | Kleiner |
| 6,255,371 | B1 |   | 7/2001 | Schlosser et al. |
| 6,344,158 | B1 |   | 2/2002 | Schlosser et al. |
| 6,365,071 | B1 |   | 4/2002 | Jenewein et al. |
| 6,642,288 | B1 | * | 11/2003 | Hulskotte .................... 524/100 |

| 2001/0007888 | A1 |   | 7/2001 | Asano |
| 2004/0013833 | A1 | * | 1/2004 | Lee ........................ B29C 49/22 428/35.7 |
| 2007/0093616 | A1 | * | 4/2007 | Strauch .................... B29B 9/12 525/425 |
| 2008/0021138 | A1 | * | 1/2008 | Liang ..................... C08L 53/00 524/265 |
| 2008/0251407 | A1 | * | 10/2008 | Visser .................... C08L 67/02 206/497 |
| 2009/0312468 | A1 | * | 12/2009 | Tsunoda ................. C08L 77/06 524/130 |
| 2010/0227957 | A1 | * | 9/2010 | Fujii ...................... C08L 77/00 524/126 |
| 2011/0306256 | A1 | * | 12/2011 | Elia ................................ 442/59 |

FOREIGN PATENT DOCUMENTS

| EP | 0699708 | A2 |   | 8/1995 |   |
| EP | 0682057 | A1 |   | 11/1995 |   |
| EP | 0837100 | A1 |   | 4/1998 |   |
| EP | 0632703 | B1 |   | 3/1999 |   |
| EP | 984087 | A1 |   | 3/2000 |   |
| EP | 0832149 | B1 |   | 7/2000 |   |
| EP | 664320 | B1 |   | 10/2001 |   |
| EP | 2003158 | A2 |   | 12/2008 |   |
| FR | 2743077 | A1 |   | 12/1995 |   |
| FR | 2779730 | B1 |   | 12/1999 |   |
| GR | WO 2010069835 | A1 | * | 6/2010 | ............ C08K 5/134 |
| WO | 9723565 | A1 |   | 7/1997 |   |

(Continued)

OTHER PUBLICATIONS

Lotader 3210 technical data sheet, Apr. 2014.*
Lotader 3210 technical data sheet, Sep. 2010.*
John et al. "Synthesis and properties of reactively compatibilized polyester and polyamide blends", Polymer International, 49, 860-866, Jul. 21, 2000.*
Jou et al, "Flame retardant and dielectric properties of glass fibre reinforced nylon-66 filled with red phosphorous", Polymer Degradation and Stability, 74, 239-245, Dec. 2001.*
C.C. Huang et al., Polymer, 1997, 38(7), 2135-2141.
C.C. Huang et al., Polymer, 1997, 38(17), 4287-4293.
Journal of Applied Polymer Science, 1996, 60, 1803-1810.
K. C. Chiou et al., Journal of Applied Polymer Science: Part B: Polymer Physics, 2000, 38, 23-33.

*Primary Examiner* — Christopher M Rodd
(74) *Attorney, Agent, or Firm* — Osha Liang LLP

(57) ABSTRACT

The present invention relates to a composition comprising at least a thermoplastic polyamide resin, a thermoplastic polyester resin, a reinforcing or bulking filler and a fire retardant. Said composition does not comprise any compatibilizer for the polyamide and the polyester, such as an agent of polymeric type, and especially no epoxy resin. Such a fire-retardant polyamide/polyester composition shows good compatibility and good mechanical and fire-retardant properties, especially a good capacity not to form flames in the presence of glowing agents, for example in the field of domestic electrical appliances, electrics and electronics.

15 Claims, No Drawings

(56) References Cited

FOREIGN PATENT DOCUMENTS

| WO | 98/39306 A1 | 2/1998 |
| WO | 98/08898 A1 | 3/1998 |
| WO | 98/45364 A1 | 10/1998 |
| WO | 99/03909 A1 | 1/1999 |
| WO | 00/68298 A1 | 11/2000 |
| WO | 2010146143 A1 | 12/2010 |

\* cited by examiner

FIRE-RETARDANT COMPOSITION OF AN ALLOY OF POLYAMIDE AND POLYESTER RESINS

RELATED APPLICATIONS

This application is a U.S. national stage entry under 35 U.S.C. §371 of International Application No. PCT/EP2012/066181, filed Aug. 20, 2012, the whole content of which is hereby incorporated herein by reference.

The present invention relates to a composition comprising at least a thermoplastic polyamide resin, a thermoplastic polyester resin, a reinforcing or bulking filler and a fire retardant. Said composition does not comprise any compatibilizer for the polyamide and the polyester, such as an agent of polymeric type, and especially no epoxy resin. Such a fire-retardant polyamide/polyester composition shows good compatibility and good mechanical and fire-retardant properties, especially a good capacity not to form flames in the presence of glowing agents, for example in the field of domestic electrical appliances, electrics and electronics.

PRIOR ART

Polyamide resin has good mechanical, chemical and thermal properties and is thus used in many fields. However, a polyamide resin has poor dimensional stability and the mechanical properties of the polyamide resin reduce with the absorption of water. Consequently, an attempt was made to improve the properties of polyamide resin by mixing in the melt the polyamide resin with another thermoplastic resin such as a polyester resin to form a melt blend. However, given that a thermoplastic polyamide resin shows poor compatibility with a thermoplastic polyester resin, a mixture formed from only the two resins has poor processability and properties.

It is known practice from U.S. Pat. No. 4,150,674 to use a lactam terpolymer as compatibilizer during the mixing of a polyamide resin with a polyester resin and to use the product thus obtained for fabrics. In addition, U.S. Pat. No. 5,055,509 describes the introduction of an arylphosphonyl azide as compatibilizer. However, the effects of the compatibilizing of these compounds were not clearly verified and the products thus obtained do not give the desired properties.

U.S. Pat. No. 5,296,550, U.S. Pat. No. 5,475,058 and patent applications EP 664 320 and EP 984 087 describe a composition which improves the compatibility between the two resins by adding an olefinic resin obtained by copolymerization by grafting a monomer of ethylenic type, for example styrene or methacrylate, with a monomer which bears a glycidyl group, for example glycidyl methacrylate. However, this composition has drawbacks such as reduced rigidity when compared with the polyamide or polyester resins themselves.

C. C. Huang et al., Polymer, 1997, 38(7), 2135-2141 and C. C. Huang et al., Polymer, 1997, 38(17), 4287-4293, describe mixtures of poly(butylene terephthalate) and polyamide-6,6 which make use of an epoxy resin of the bisphenol-A type in solid form with an epoxy-equivalent weight (EEW) of 2 060 g/eq. J. An et al., Journal of Applied Polymer Science, 1996, 60, 1803-1810, describes alloys of PBT and PA-6 (polyamide-6) with various amounts of epoxy resin E-44 (EEW=210 g/eq). K. C. Chiou et al., Journal of Applied Polymer Science: Part B: Polymer Physics, 2000, 38, 23-33, makes use of a multifunctional epoxy resin (EEW=110 to 130 g/eq) as a coupling agent for compatibilizing PA 6/PBT mixtures. However, in the case of using an epoxy resin with a low epoxy-equivalent weight in polymer blends, the processability and the properties of the polymer blends are still unsatisfactory and must be improved.

Formulations are moreover sought, especially for the electrical and electronic fields, which are capable of not forming flames when they are placed in the presence of a nearby glowing object; this property being different from the standard fire-retardant properties measured by the UL-94 tests. Now, it has just been demonstrated that the presence of an agent for compatibilizing between polyamide and polyester, such as epoxy resin, is harmful to this property of not forming flames.

There is thus a need to develop fire-retardant polyamide/polyester formulations which show good compatibility and good mechanical and fire-retardant properties, especially a good capacity not to form flames in the presence of glowing agents, for example in the field of domestic electrical appliances, electrics and electronics.

INVENTION

The applicant has just developed a formulation comprising polyamide and polyester, fire retardants and reinforcing or bulking fillers, which has all the advantages mentioned previously.

The present invention relates to a composition comprising at least:
(a) a thermoplastic polyamide resin;
(b) a thermoplastic polyester resin;
(c) a reinforcing or bulking filler; and
(d) a fire retardant,
the composition not comprising any compatibilizer for the polyamide and the polyester, such as an agent of polymeric organic type, and especially no epoxy resin.

The composition according to the present invention thus does not comprise any agent for compatibilizing the polyamide and the polyester that is conventionally used for this purpose, such as the compounds already described previously, especially epoxy resins conventionally comprising at least two epoxy groups per molecule. Purely for information purposes, these epoxy resins are generally resins of the BADGE type (bisphenol A diglycidyl ether), of the BFDGE type (bisphenol F diglycidyl ether) or of the hydrogenated BPA type (hydrogenated bisphenol A), for example.

(a) Polyamide Resin

The polyamide resin included in the composition of the present invention may be any thermoplastic polyamide resin. Examples of a polyamide resin may comprise a polyamide-6 which may be obtained as polymerization products via ring opening of lactams such as ε-caprolactam and ω-dodecalactam; polyamide polymers which may be obtained from amino acids such as aminocaproic acid, 11-aminoundecanoic acid and 12-aminododecanoic acid; aliphatic, cycloaliphatic or aromatic diamines such as ethylenediamine, tetramethylenediamine, hexamethylenediamine, undecamethylenediamine, dodecamethylenediamine, 2,2,4-trimethylhexamethylenediamine, 2,4,4-trimethylhexamethylenediamine, 5-methylnonahexamethylenediamine, m-xylenediamine, p-xylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexane)methane, bis(4-methyl-4-aminocyclohexyl)methane, 2,2-bis(4-aminocyclohexyl)propane, bis(aminopropyl)piperazine, aminoethylpiperidine, etc.; polyamide polymers which may be obtained from aliphatic, cycloaliphatic or aromatic dicarboxylic acids such as adipic acid, sebacic acid, azelaic acid, dodecanedioic acid, terephthalic acid, isophthalic acid, 2-chloroterephthalic acid, 2-methylterephthalic acid and 5-methylisophthalic acid and copolymers of polyamide resins, and the latter may be used alone or as a combination of two or more types.

In certain embodiments, examples of the polyamide resin may comprise polyamide-6, polyamide-66, polyamide-610, polyamide-11, polyamide-12, polyterephthalamide, polyisophthalamide and polyaramids.

The polyamide matrix may especially be a polymer comprising star or H-branched macromolecular chains, a branched or hyperbranched polymer, and, where appropriate, a polymer comprising linear macromolecular chains. Polymers comprising such star or H macromolecular chains are described, for example, in documents FR 2 743 077, FR 2 779 730, U.S. Pat. No. 5,959,069, EP 0 632 703, EP 0 682 057 and EP 0 832 149.

According to another particular variant of the invention, the polyamide matrix of the invention may be a polymer of random tree type, preferably a copolyamide of random tree structure. These copolyamides of random tree structure and the process for obtaining them are especially described in document WO 99/03909. The matrix of the invention may also be a composition comprising a linear thermoplastic polymer and a star, H and/or tree thermoplastic polymer as described above. The matrix of the invention may also comprise a hyperbranched copolyamide of the type described in document WO 00/68298. The composition of the invention may also comprise any combination of linear, star, H or tree thermoplastic polymer and hyperbranched copolyamide as described above.

In one embodiment, the relative viscosity of the polyamide resin may range from 2.0 to 3.7 (a solution of 1 g of polymer in 100 ml of 90% formic acid, measured at 25° C.). In another embodiment, the number-average molecular mass of the polyamide resin may range from about 5000 to 70 000.

In one embodiment, the content of the polyamide resin may be chosen according to the desired properties. In one embodiment, the polyamide resin may be included in an amount of from 1% to 98% by weight relative to the total weight of the composition, more preferentially in proportions of between 40% and 70% by weight.

The weight proportion of polyamide in the composition is preferentially greater than the weight proportion of polyester in said composition.

(b) Polyester Resin

The polyester resin included in the composition of the present invention may be a polymeric compound which bears ester bonds in its backbone. Examples of the polyester resin may include a homopolymer or a copolymer which may be obtained by condensation of a dicarboxylic acid, or of derivatives thereof which can form an ester, with a diol or derivatives thereof which can form an ester, or a mixture thereof.

In one embodiment, an example of a dicarboxylic acid may comprise an aromatic dicarboxylic acid such as terephthalic acid, isophthalic acid, phthalic acid, 1,4-, 1,5-, 2,6- or 2,7-naphthalenedicarboxylic acid, bis(p-carboxyphenyl)methane, anthracenedicarboxylic acid, 4,4'-diphenyl ether carboxylic acid, 5-sodiumsulfoisophthalic acid, etc.; an aliphatic dicarboxylic acid such as adipic acid, sebacic acid, azelaic acid, dodecanedioic acid, etc.; a cycloaliphatic dicarboxylic acid such as 1,3-cyclohexanedicarboxylic acid, 1,4-cyclohexanedicarboxylic acid, etc.; and derivatives thereof which can form an ester, but without being limited thereto. In certain embodiments, said dicarboxylic acid may be used in the form of a derivative which can form an ester, such as a derivative substituted with an alkylalkoxy, or a halogen, etc., and an ester obtained from a lower alcohol, for example the dimethyl ester.

In another embodiment, examples of said diols may include an aliphatic glycol with from 2 to 20 carbon atoms such as ethylene glycol, propylene glycol, 1,4-butanediol, neopentyl glycol, 1,5-pentanediol, 1,6-hexanediol, decamethylene glycol, cyclohexanedimethanol, cyclohexanediol, etc.; a long-chain glycol with a molecular weight of from 400 to 6000 such as polyethylene glycol, poly-1,3-propylene glycol, polytetramethylene glycol, etc.; and derivatives thereof which can form an ester, but without being limited thereto. In certain embodiments, said diols may be used in the form of derivatives thereof which can form an ester, such as a derivative substituted with an alkyl or alkoxy group or a halogen, etc.

In a certain embodiment, examples of the homopolymer or copolymer thereof may include polybutylene terephthalate, polybutylene (terephthalate/isophthalate), polybutylene (terephthalate/adipate), polybutylene (terephthalate/sebacate), polybutylene (terephthalate/decanedicarboxylate), polybutylene naphthalate, polyethylene terephthalate, polyethylene (terephthalate/isophthalate), polyethylene (terephthalate/adipate), polyethylene (terephthalate/5-sodiumsulfoisophthalate), polybutylene (terephthalate/5-sodiumsulfoisophthalate), polypropylene terephthalate, polyethylene naphthalate, polycyclohexanedimethylene terephthalate, but without being limited thereto.

In another embodiment, examples of the polyester resin other than the above compounds may include a polyester resin copolymerized with a copolymerizable monomer, for example a hydroxycarboxylic acid such as glycolic acid, hydroxybenzoic acid, hydroxyphenylacetic acid, naphthylglycolic acid, etc.; and a lactone compound such as propiolactone, butyrolactone, caprolactone, valerolactone, etc. In yet another embodiment, examples of the polyester resin may include a polyester resin derived from compounds forming a multifunctional ester such as trimethylolpropane, trimethylolethane, pentaerythritol, trimellitic acid, trimesic acid or pyromellitic acid, or a polyester resin having a branched or crosslinked structure in an amount at which the polyester resin maintains thermoplasticity.

The content of the polyester resin may be chosen according to the desired properties. In one embodiment, the polyester resin may be included in an amount of from 1% to 98% by weight relative to the total weight of the composition, more preferentially in proportions of between 5% and 40% by weight.

The polyester resin may especially be a recycled polyester originating especially from articles at the end of their service life or from production waste. These polyesters may originate from textile articles, bottles, films or technical plastics, especially composites. The polyesters may be used directly or after one or more possible treatments, especially hydrolysis or treatments for separating the fillers and additives from the polyester compositions. The waste may be, for example, broke or material ground in the form of fragments, powders or granules.

According to the invention, it is possible to use in the composition a mixture of polyester and of recycled polyester.

(c) Reinforcing or Bulking Fillers

The composition may comprise fibrous and/or non-fibrous fillers.

Mention may be made, as fibrous fillers, of glass fibers, carbon fibers, natural fibers, aramid fibers and nanotubes, in particular carbon nanotubes. Mention may be made, as natural fibers, of hemp and flax. Mention may in particular be made, among non-fibrous fillers, of all particulate or lamellar fillers and/or exfoliable or non-exfoliable nanofillers, such as alumina, carbon black, aluminosilicate clays, montmorillonites, zirconium phosphate, kaolin, calcium carbonate, diatomaceous earths, graphite, mica, silica, titanium dioxide, zeolites, talc, wollastonite, polymeric fillers, such as, for example, dimethacrylate particles, glass beads or glass powder.

It is perfectly possible according to the invention for the composition to comprise several types of reinforcing fillers. Preferentially, the most widely used filler can be glass fibers, of the "chopped" type, in particular having a diameter of between 7 and 14 μm. These fillers may have surface sizing, ensuring mechanical adhesion between the fibers and the polyamide matrix.

The concentration by weight of the reinforcing or bulking fillers is advantageously between 1% and 60% by weight, preferably between 15% and 50% by weight, with respect to the total weight of the composition.

(d) Fire Retardant

The composition according to the present invention may especially comprise fire retardants generally used in the polyamide field; i.e. compounds which make it possible to reduce flame propagation and/or which have fire-retardant properties, which are well known to those skilled in the art. These fire retardants are normally used in fire-retardant compositions and are described in particular, for example, in U.S. Pat. No. 6,344,158, U.S. Pat. No. 6,365,071, U.S. Pat. No. 6,211,402 and U.S. Pat. No. 6,255,371, cited herein by way of reference.

Advantageously, the composition comprises at least one fire retardant chosen from the group comprising:
  phosphorus-bearing fire retardants, such as:
    phosphine oxides, for instance triphenylphosphine oxide, tris(3-hydroxypropyl)phosphine oxide and tris(3-hydroxy-2-methylpropyl)phosphine oxide;
    phosphonic acids or salts thereof or phosphinic acids or salts thereof, for instance zinc, magnesium, calcium, aluminum or manganese salts of phosphinic acids, in particular the aluminum salt of diethylphosphinic acid or the zinc salt of dimethylphosphinic acid;
    cyclic phosphonates, such as cyclic diphosphate esters, for instance Antiblaze 1045;
    organic phosphates, such as triphenyl phosphate;
    inorganic phosphates, such as ammonium polyphosphates and sodium polyphosphates;
    red phosphorus, whether, for example, in stabilized or coated form, as a powder or in the form of masterbatches;
  fire retardants of the organonitrogen compound type, for instance triazines, cyanuric acid and/or isocyanuric acid, melamine or derivatives thereof, such as melamine cyanurate, melamine oxalate, phthalate, borate, sulfate, phosphate, polyphosphate and/or pyrophosphate, condensed melamine products, such as melem, melam and melon, tri(hydroxyethyl) isocyanurate, benzoguanamine, guanidine, allantoin and glycoluril;
  fire retardants containing halogenated derivatives, such as:
    bromine derivatives, for instance PBDPOs (polybromodiphenyl oxides), BrPS (polybromostyrene and brominated polystyrene), poly(pentabromobenzyl acrylate), brominated indane, tetradecabromodiphenoxybenzene (Saytex 120), 1,2-bis(pentabromophenyl)ethane or Saytex 8010 from Albemarle, tetrabromobisphenol A and brominated epoxy oligomers. Mention may in particular be made, among brominated derivatives, of polydibromostyrene, such as PDBS-80 from Chemtura, brominated polystyrenes, such as Saytex HP 3010 from Albemarle or FR-803P from Dead Sea Bromine Group, decabromodiphenyl ether (DBPE) or FR-1210 from Dead Sea Bromine Group, octabromodiphenyl ether (OBPE), 2,4,6-tris (2,4,6-tribromophenoxy)-1,3,5-triazine or FR-245 from Dead Sea Bromine Group, poly(pentabromobenzyl acrylate) or FR-1025 from Dead Sea Bromine Group, and epoxy-terminated oligomers or polymers of tetrabromobisphenol A, such as F-2300 and F2400 from Dead Sea Bromine Group.
    chlorinated compounds, for instance a chlorinated cycloaliphatic compound, such as Dechlorane Plus® (sold by OxyChem, see CAS 13560-89-9).

These compounds may be used alone or in combination, sometimes synergistically. Preference is given in particular to a synergistic combination of phosphorus-comprising compounds, such as phosphine oxides, phosphonic acids or salts thereof or phosphinic acids or salts thereof, and cyclic phosphonates, with nitrogen-comprising derivatives, such as melam, melem, melamine phosphate, melamine polyphosphates, melamine pyrophosphates or ammonium polyphosphates.

Preference is especially given to a composition according to the invention comprising a compound F1 of formula:

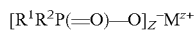

in which:
  $R^1$ and $R^2$ are identical or different and represent a linear or branched alkyl chain comprising from 1 to 6 carbon atoms and preferentially from 1 to 3 carbon atoms, and/or an aryl radical;
  M represents a calcium, magnesium, aluminum and/or zinc ion, preferentially a magnesium and/or aluminum ion;
  Z represents 2 or 3, preferentially 3.

The composition of the invention may also comprise a compound F2 which is a product of reaction between phosphoric acid and melamine and/or a product of reaction between phosphoric acid and a condensed melamine product.

The composition of the invention may also comprise the compounds F1 and F2.

Such a fire-retardant system is described especially in U.S. Pat. No. 6,255,371. The composition may comprise from 1% to 70% by weight of this fire-retardant system, preferentially from 5% to 40%, even more preferentially from 10% to 30% and particularly from 15% to 30% relative to the total weight of the composition. Preferentially, the weight ratio of compounds F1 and F2 is, respectively, between 1:1 and 4:1 and preferentially about 3:2.

$R^1$ and $R^2$ may be identical or different and represent a methyl, ethyl, n-propyl, isopropyl, n-butyl, tert-butyl, n-pentyl and/or aryl, for instance a phenyl. M is preferentially an aluminum ion. The phosphinic acid of compound F1 may be chosen, for example, from the group consisting of dimethylphosphinic acid, ethylmethyl phosphinic acid, diethylphosphinic acid and methyl-n-propylphosphinic acid, or a mixture thereof. Various phosphonic acids may be used in combination.

The phosphinic acid salts according to the invention may be prepared according to the usual methods that are well known to those skilled in the art, for instance that described in patent EP 0 699 708. The phosphinic acid salts according to the invention may be used in various forms depending on the nature of the polymer and on the desired properties. For example, to obtain good dispersion in the polymer, a phosphinic acid salt may be in the form of fine particles.

Compound F2 is a product of reaction between phosphoric acid and melamine and/or a product of reaction between phosphoric acid and a condensed melamine product. Various compounds F2 may be used in combination. The condensed melamine products are, for example, melam, melem and melon. Even more condensed compounds may also be used. Preferentially, compound F2 may be chosen, for example, from the group consisting of the following reaction products: melamine polyphosphate, melam polyphosphate and melem polyphosphate, or a mixture thereof. It is particularly preferable to use a melamine polyphosphate containing chains with a length of greater than 2 and in particular greater than 10.

These compounds are especially described in patent WO 98/39306. Compounds F2 may also be obtained via processes other than those based on direct reaction with a phosphoric acid. For example, melamine polyphosphate may be prepared by reaction of melamine with polyphosphoric acid (see WO 98/45364), but also by condensation of melamine phosphate and of melamine pyrophosphate (see WO 98/08898).

In an entirely preferential manner, the fire-retardant system of the present invention comprises a compound F1 in which $R^1=R^2=$ethyl, M=aluminum and Z=3; and a compound F2: melamine polyphosphate. The weight ratio of compounds F1 and F2 may be, respectively, 3:2.

It is also possible to add to the formulation other compounds participating in the fire retardancy, for instance zinc borate, zinc oxide and magnesium hydroxide.

In general, the composition may comprise from 1% to 40% by weight of fire retardants, relative to the total weight of the composition, preferentially from 1% to 20% by weight and more preferentially from 1% to 10% by weight.

Other Compounds and Additives

In certain embodiments, depending on the desired final property, a resin alloy composition may also comprise other polymer resins, for example polyethylene, polystyrene, polypropylene, ABS resin, polycarbonate, polyphenylene sulfide, polyphenylene oxide, polyacetal, polysulfone, polyether sulfone, polyetherimide, polyether ketone, a polylactic acid resin, a polysulfone resin, an elastomeric resin, or blends thereof.

The composition may also comprise impact modifiers. They are generally elastomeric polymers that may be used for this purpose. The agents that modify the toughness are generally defined as having an ASTM D-638 tensile modulus of less than approximately 500 MPa. Examples of suitable elastomers are ethylene/acrylic ester/maleic anhydride copolymers, ethylene/propylene/maleic anhydride copolymers or EPDM (ethylene/propylene/diene monomer) copolymers with, optionally, a grafted maleic anhydride. The concentration of elastomer by weight is advantageously between 0.1% and 30%, with respect to the total weight of the composition.

Preference is given especially to impact modifiers comprising functional groups that are reactive with the polyamide. Mention may be made, for example, of terpolymers of ethylene, acrylic ester and glycidyl methacrylate, copolymers of ethylene and butyl ester acrylate, copolymers of ethylene, n-butyl acrylate and glycidyl methacrylate, copolymers of ethylene and maleic anhydride, styrene/maleimide copolymers grafted with maleic anhydride, styrene/ethylene/butylene/styrene copolymers modified with maleic anhydride, styrene/acrylonitrile copolymers grafted with maleic anhydride, acrylonitrile/butadiene/styrene copolymers grafted with maleic anhydride, and the hydrogenated versions thereof. The proportion by weight of these modifiers in the total composition is in particular between 0.1% and 40%.

In one embodiment, in a context which does not infringe the objective of the present invention, additives such as antioxidants, heat stabilizers, UV radiation absorbers such as aromatic amines, hindered phenols, phosphorus and sulfur, etc., dispersants, dyes, pigments, surfactants, mold-release agents, lubricants, plasticizers or lustre-enhancing agents, which are generally used as plastics processing agents, may be used for transmitting various effects.

Manufacture of the Composition

The resin alloy composition of the polyamide resin and of the polyester resin may be obtained by melt-blending the components using a conventional extruder, for example a single-screw extruder or a twin-screw extruder. A general range for the temperature of the cylinder inside the extruder may be adjusted taking into account the melting point of the resin. In an illustrative embodiment, when a polyamide-6 resin is used, the temperature may be set at 250° C., and when a polyamide-66 resin is used, the temperature may be set at 280° C.

In addition, the resin alloy composition of the present patent application may be treated in the desired shapes such as a pellet, a plaque, a fiber, a strand, a film, a sheet, a tube, a hollow body or a box, via treatment processes such as conventional calender-molding, compression-molding, blow-molding, injection-molding or melt-molding, but the treatment processes or shapes are not limited thereto.

The composition according to the present invention may be used according to the general use of a polyamide resin or of a polyester resin. For example, it may be applied in various ways to general accessories of precision machinery, to motor vehicle accessories, to electrical-electronic accessories, to construction materials, to films, to fibers and to sports equipment.

Examples described below serve to further explain the characteristics and advantages of the subject of the present disclosure, but without being limited to the examples presented below. The subject of the present disclosure should not be limited to the specific embodiment and to the examples described herein. In the light of the present disclosure, a person skilled in the art can easily see that it is possible to modify, replace or add and combine part of the constitutions described in the present disclosure other than the various illustrative embodiments and examples.

EXPERIMENTAL SECTION

In the examples and the comparative examples that follow, the resin alloy composition of the present invention and the comparative composition are prepared, respectively, and their properties are then compared, from which the superior effects of the alloy composition of the polyamide resin and of the polyester resin of the present invention are described in detail.

Initially, each component used in the examples and the comparative examples of the present invention are classified and explained below, and they are indicated with reference symbols.

Polyamide-66 thermoplastic {trade name: Technyl 23A, manufactured by Rhodia}.
Polyester: polyethylene terephthalate resin {trade name: Eslon PET-2211, manufactured by Woongjin Chemical}.
Red phosphorus: masterbatch FR4260
Glass fibers
Epoxy resin of BADGE type {epoxy-equivalent weight: 3000 g/eq}, manufactured by Kukdo Chemical, Co., Ltd.
Impact modifier: Lotader 3210

The components chosen above are mixed uniformly in a super-mixer according to each mixing ratio of the examples and of the comparative examples. A twin-screw extruder (inside diameter of 30 mm, L/D=30) is used. The temperatures of the cylinder inside the extruder are set at about 280° C., taking into account the melting point of the resin used, and the gas inside the screws is spent at a screw spin speed of 250 to 300 rpm and a vacuum pump pressure of 50 to 70 cmHg. The components are mixed thoroughly inside the cylinder of the extruder and the extrudate formed is immersed in a bath of cold water and pelletized to a prescribed size using a pelletizer.

An injection machine (German, Engel) with a closing force of 80 tonnes and an injection volume of 189.44 cc (6.4 oz) is used to prepare the sample for various property tests. After the preparation of the sample of the composition by molding under the molding temperature conditions of the general range, taking into account the melting point of the resin used, a molding temperature of 80° C., an injection pressure of 50 to 80 bar, an injection speed of 40 to 60 mm/sec, an injection time of 3 seconds and a cooling time of 15 seconds.

The overall properties are reported in Table 1 below:

TABLE 1

| Component (weight %) | Comparative Example 1 | Example 1 | Example 2 |
|---|---|---|---|
| Polyamide | 47.7 | 48.2 | 45.2 |
| Polyester | 20.0 | 20.0 | 20.0 |
| Glass fibers | 25.0 | 25.0 | 25.0 |
| Fire retardant | 6.6 | 6.6 | 6.6 |
| Epoxy resin | 0.5 | — | — |
| Impact modifier | — | — | 3.0 |
| Tensile strength ASTM D-638 (kgf/cm$^2$) | 1671 | 1656 | 1579 |
| Elongation at break ASTM D-638 (%) | 2.9 | 2.5 | 2.7 |
| Modulus of rupture | 2397 | 2266 | 2162 |
| Flexural modulus ASTMD790 (kgf/cm$^2$) | 82990 | 84250 | 79940 |
| IZOD impact ASTMD256 (kgf/cm/cm) | 7.25 | 6.9 | 6.96 |
| GWIT, 775° C., 2 mm | Fails | Passes | Passes |
| UL 94 0.8 mm | V-1 | V-1 | V-0 |
| CTI IEC 112(V) | | | 600 |

In the GWIT test, the capacity to not form a flame following the application of a glowing wire is measured according to standard IEC 60695-2-13 on specimens with a thickness of 1.0 mm, at a temperature of 750° C. The standard envisages that when the sample successfully passes the test at 750° C., 25° C. are added to this temperature, and the sample is consequently classified with a GWIT of 775° C. It is noted that the composition successfully passes the test when there is no ignition during the application of the glowing wire. It is noted that the composition fails the test when there is ignition during the application of the glowing wire, i.e. production of flames with a duration of more than seconds. The test is successfully passed when the three different specimens successfully confirm the same temperature.

Another comparative example was performed similar to Example 1, but without fire retardant or glass fibers. It is not possible to obtain an extruded rod because the polyamide and the polyester are so incompatible. No granules could be obtained.

It is thus observed that the absence of an agent for compatibilizing between the polyamide and the polyester, such as the epoxy resin, better fire retardancy properties are obtained, especially the GWIT, when compared with a known composition of the prior art, while at the same time notably maintaining the mechanical properties; and this being achieved using a relatively small amount of fire retardants in the formulation.

A composition similar to that of Example 1, but comprising another fire-retardant system, namely a compound F1 in which $R^1=R^2$=ethyl, M=aluminum and Z=3; and a compound F2: melamine polyphosphate (the weight ratio of compounds F1 and F2 is, respectively, 3:2) was produced and tested. Mechanical properties equivalent to or even greater than those of the composition of Example 1 are observed, while at the same time having a category V0 in test UL94 at 0.8 mm and which passes the GWIT test, 775° C., 2 mm.

The invention claimed is:
1. A composition consisting of:
 (a) from 40 to 70% by weight (wt %) of a thermoplastic polyamide resin;
 (b) from 5 to 40 wt % of a thermoplastic polyester resin;
 (c) a reinforcing or bulking filler;
 (d) a fire retardant; and
 (e) an impact modifier consisting of ethylene/acrylic ester/maleic anhydride terpolymer,
 wherein the amount of (a) to (e) total 100 wt % based on the composition, and the composition does not comprise any epoxy resin compatibilizer for the polyamide and the polyester.
2. The composition as claimed in claim 1, wherein said polyamide resin is one or more compounds selected from the group consisting of polyamide-6, polyamide-66, polyamide-610, polyamide-11, polyamide-12, polyterephthalamide, polyisophthalamide and polyaramids.
3. The composition as claimed in claim 1, wherein said polyester resin or more compounds selected from the group consisting of polybutylene terephthalate, polybutylene (terephthalate/isophthalate), polybutylene (terephthalate/adipate), polybutylene (terephthalate/sebacate), polybutylene (terephthalate/decanedicarboxylate), polybutylene naphthalate, polyethylene terephthalate, polyethylene (terephthalate/isophthalate), polyethylene (terephthalate/adipate), polyethylene (terephthalate/5-sodiumsulfoisophthalate), polybutylene (terephthalate/5-sodiumsulfoisophthalate), polypropylene terephthalate, polyethylene naphthalate, and polycyclohexanedimethylene terephthalate.
4. The composition as claimed in claim 1, wherein said polyester resin is a recycled resin.
5. The composition as claimed in claim 1, wherein the reinforcing or bulking filler is a fibrous filler.
6. The composition as claimed in claim 5, wherein the fibrous filler is selected from the group consisting of: glass fibers, carbon fibers, natural fibers, aramid fibers, and nanotubes.
7. The composition as claimed in claim 1, wherein the reinforcing or bulking filler is present in an amount ranging from 1% to 60% by weight of the composition.

8. The composition as claimed in claim 1, wherein the fire retardant is selected from the group consisting of: phosphorus-bearing fire retardants; fire retardants of organonitrogen compound; and halogenated fire retardants.

9. The composition as claimed in claim 1, wherein the fire retardant is a combination of phosphorus-bearing compounds, and nitrogenous derivatives.

10. The composition as claimed in claim 8, wherein the fire retardant is at least one phosphorous-bearing fire retardant selected from the group consisting of phosphine oxides, phosphonic acids or salts thereof, phosphinic acids or salts thereof, cyclic phosphonates, organic phosphates, inorganic phosphates, and red phosphorus.

11. The composition as claimed in claim 8, wherein the fire retardant is an organonitrogen compound selected from the group consisting of triazines, cyanuric acid and/or isocyanuric acid, tri(hydroxyethyl) isocyanurate, benzoguanamine, guanidine, allantoin, glycoluril, and melamine or derivatives thereof selected from the group consisting of melamine cyanurate, melamine oxalate, melamine phthalate, melamine borate, melamine sulfate, melamine phosphate, melamine polyphosphate, melamine pyrophosphate, melem, melam, and melon.

12. The composition as claimed in claim 1, wherein the fire retardant is at least one halogenated fire retardant selected from the group consisting of brominated fire retardants and chlorinated fire retardants.

13. The composition as claimed in claim 9, wherein the fire retardant is a combination of:
   a phosphorus-bearing compound, selected from phosphine oxides, phosphonic acids or salts thereof, phosphinic acids or salts thereof, and cyclic phosphonates, and
   a nitrogenous derivative selected from melam, melem, melamine phosphate, melamine polyphosphates, melamine pyrophosphates, and ammonium polyphosphates.

14. The composition as claimed in claim 1, wherein the composition has a flame retardancy rating of V-0 according to UL 94, 0.8 mm.

15. The composition as claimed in claim 1 wherein the fire retardant is present in an amount ranging from 1-10 wt. % of the composition.

* * * * *

UNITED STATES PATENT AND TRADEMARK OFFICE
CERTIFICATE OF CORRECTION

PATENT NO. : 9,765,217 B2
APPLICATION NO. : 14/241335
DATED : September 19, 2017
INVENTOR(S) : Mok-Keun Lim It is certified that error appears in the above-identified patent and that said Letters Patent is hereby corrected as shown below:

In the Claims

At Column 10, Claim number 3, Line number 46, the word "resin or more" should read -- resin is one or more --

Signed and Sealed this
Eighth Day of May, 2018

Andrei Iancu
*Director of the United States Patent and Trademark Office*